C. D. EHRET.
PROCESS AND APPARATUS FOR MAKING WIRE GLASS.
APPLICATION FILED OCT. 20, 1910.
1,113,208.
Patented Oct. 13, 1914.
2 SHEETS—SHEET 1.
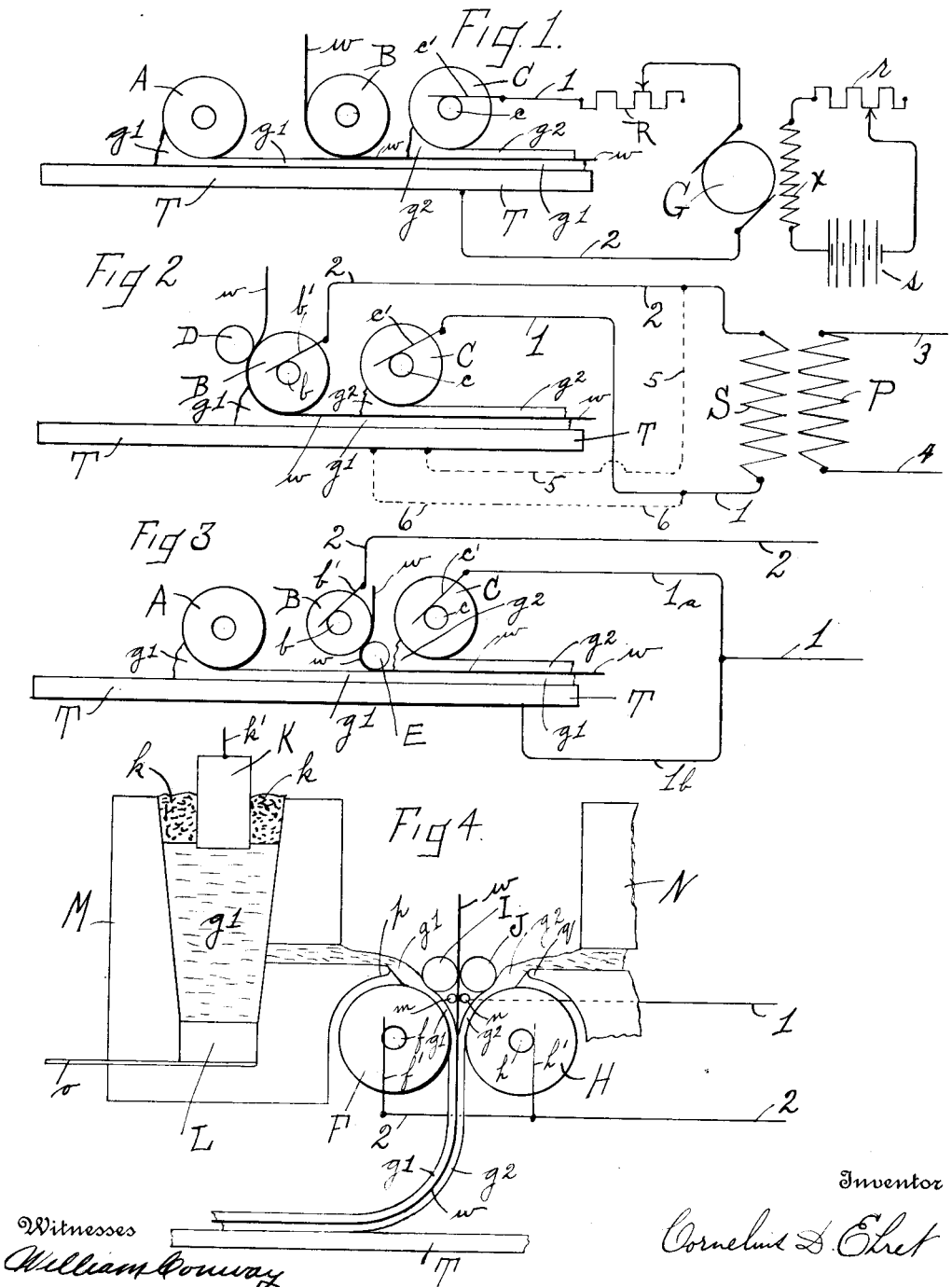
Witnesses
William Conway
Anna E. Steinbock
Inventor
Cornelius D. Ehret C. D. EHRET.
PROCESS AND APPARATUS FOR MAKING WIRE GLASS.
APPLICATION FILED OCT. 20, 1910.
1,113,208.
Patented Oct. 13, 1914.
2 SHEETS—SHEET 2.
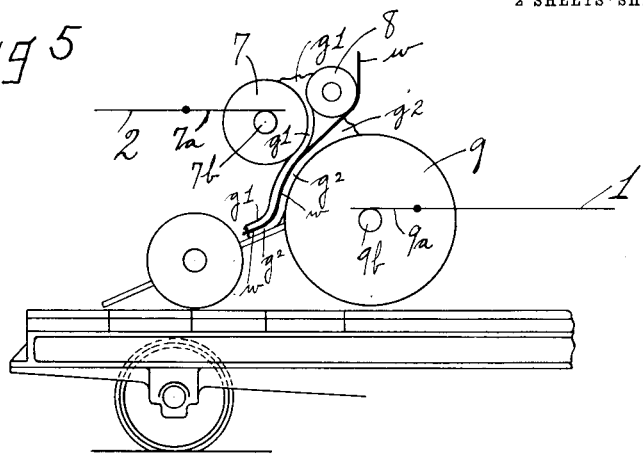
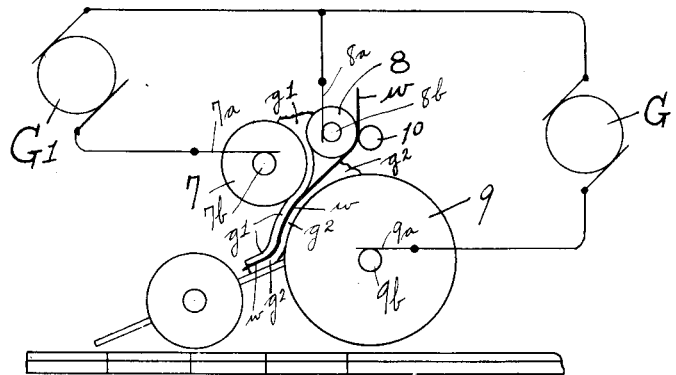
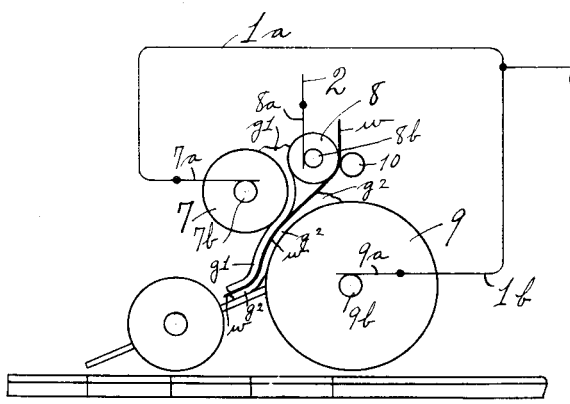
Inventor
Cornelius D. Ehret
Witnesses
William Conway
Anna E. Steinbock

UNITED STATES PATENT OFFICE.

CORNELIUS D. EHRET, OF PHILADELPHIA, PENNSYLVANIA.

PROCESS AND APPARATUS FOR MAKING WIRE-GLASS.

1,113,208.  Specification of Letters Patent.  Patented Oct. 13, 1914.

Application filed October 20, 1910. Serial No. 588,033.

*To all whom it may concern:*

Be it known that I, CORNELIUS D. EHRET, a citizen of the United States, residing at Philadelphia, county of Philadelphia, and State of Pennsylvania, have invented certain new and useful Improvements in Processes and Apparatus for Making Wire-Glass, of which the following is a specification.

My invention relates to a process and apparatus for embedding material in glass or similar material, and relates particularly to the manufacture of wire glass, a well-known article of commerce, consisting of wire, in mesh or other form embedded in glass.

It is the object of my invention to improve the product by causing the glass to adhere more closely and intimately to the wire which it surrounds, and to make the process less dependent upon the heat retained in the molten glass as it is taken from the melting furnaces, and to keep the glass hot whereby a softer glass results requiring less annealing, and to cause a perfect weld between the layers of glass. To this end I take advantage of the property of glass to conduct substantial electric currents when at high temperature or molten, though an insulator when cold. During the process of embedding the wire within the molten glass, an electric current is passed through the glass or wire, or both, to cause such current to heat the glass to still higher temperature or to heat the wire as it becomes embedded in the glass, so that the glass comes into more intimate contact with the wire and makes a better finished product. The heat generated by the current passing through the glass maintains or raises the temperature of the glass and keeps it molten or increases its fluidity.

My invention resides in the matters hereinafter described and claimed.

For an illustration of some of the forms of apparatus which may be employed to carry out my process, and for a description of my process, reference is to be had to the accompanying drawings, in which:

Figure 1 is a diagrammatic view illustrating the process of making and apparatus for making wire glass, in which an electric current is passed in series through both layers of glass. Fig. 2 is a further diagrammatic view of a modified arrangement in which the current passes through the wire and then through the glass. Fig. 3 is a diagrammatic view of a further modification, in which the current is passed through the wire and through both layers of glass. Fig. 4 illustrates a process of and apparatus for the continuous production of the glass and manufacture of wire glass. Figs. 5, 6 and 7 show diagrammatically modified forms of apparatus for making wire glass.

Referring to Fig. 1, A, B and C are rolls which move with respect to the table T, as by moving along said table as well understood in the art. A pour of glass $g^1$ is placed upon the table T in advance of the roller A which moves toward the left with respect to the table T. This roller A spreads the molten glass into a layer upon the table and the meshed or other wire $w$ passes under roller B on to the layer $g^1$. A second pour of glass $g^2$ is placed above the wire $w$ and spread out into a layer $g^2$ by the roller C. The glass being molten, it will conduct an electric current. Such a current is derived from the generator or other source G and passed through an adjustable resistance R, through conductor 1, brush $c^1$ to the shaft or contact ring $c$ in electrical communication with the surface of the roller C. The current then leaves the roller C and passes through the layer of glass $g^2$ through the layer $g^1$ to the table T and through conductor 2 back to the generator G. The path for the current within the glass is short and there is relatively great area of contact between the glass and the table T and the roller C, so that relatively low potential current may be employed. The current passing through the glass heats it and makes it more fluid and molten, or maintains it at its initial temperature, and makes the layers weld thoroughly together and to come into intimate contact with the wire $w$.

The current through the glass may be varied by adjusting the resistance R and also by varying the current through the field winding $x$ of the generator G, the field here being shown, by way of example merely, as separately excited from the source $s$, the current in the field being adjusted by the resistance $r$. The current passed through the glass may be either direct or alternating current.

By the arrangement shown in Fig. 2 a pour of glass $g^1$ is placed in advance of the roller B over which the wire $w$ also passes, a roller D holding the wire $w$ firmly in contact with the roller B as it operates. This produces then a layer of glass $g^1$ with superimposed wire $w$. A second pour of glass $g^2$ is placed on top of the wire and first layer in advance of the roller C. Current is passed from conductor 1 through brush $c^1$, shaft or slip ring $c$, roller C, glass $g^2$, thence through the wire $w$ and glass $g^1$ to the roller B, the greater part of the current passing through the wire, depending upon the conductivity of the wire with respect to that of the glass. Here the current source is shown by way of example as a transformer having the secondary winding S and the primary winding P with which communicate the supply conductors 3 and 4 leading to a suitable alternating current source. The voltage of the secondary of the transformer may be suitably controlled so that the current delivered can be controlled. The transformer may be either step-up or step-down, according to conditions. Here, again, the heat produced by the current passing through the glass maintains it at high temperature or renders it more fluid so that the welding between the layers $g^1$ and $g^2$ is perfect and more intimate contact between the glass and the wire $w$ results.

As an alternative the conductor 5 may join the conductor 2 with the table T so that current will pass from conductor 1 through roller C and layer $g^2$ through the wire $w$ to roller B, conductor 2 and also through layer $g^1$ to the table T and conductor 5. A further alternative is the employment of the conductor 6 connecting the table T with the conductor 1. In such case, the current will flow from conductor 1, through both roller C and table T, through layers $g^2$ and $g^1$, and thence to the wire $w$ and roller B to conductor 2. It is to be understood that conductors 5 and 6 shall not be used simultaneously; otherwise the secondary S or other source of current employed would be short circuited.

In the arrangement shown in Fig. 3, the conductor 1 is branched into conductors $1^a$ and $1^b$ leading current respectively through the roller C and the table T to the wire $w$, which passes over the roller E held in contact therewith by the roller B with which the conductor 2 connects. Here the roller E is shown relatively small so that it may be brought up close to the pour $g^2$, so that the length of wire through which the current is passing is relatively short raising it to high temperature as it passes under the layer $g^2$ which is also heated electrically.

It is to be understood that other sources of current than those illustrated may be employed, and that in connection with Fig. 1 the source shown in Fig. 2 may be employed, and that in Fig. 2 the source shown in Fig. 1 may be employed; and that in Fig. 3 either the sources of Figs. 1 or 2 may be employed, the conductors 1 and 2 in each figure indicating those to which the current is to be supplied.

In Fig. 4, M is an electric glass furnace for the manufacture of glass, the materials from which the glass is made being represented at $k$ surrounding the carbon or other electrode K communicating by $k^1$ with one terminal of a source of current. The other terminal L communicates with the other terminal of the source of current by the conductor $o$. The glass $g^1$ becomes a resistor and by the heat generated by the current passing through it, the glass is made and flows out over the ledge $p$.

A similar furnace, shown fragmentarily only at N, also delivers glass freshly made over the ledge $q$. The glass $g^1$ passes over roller F and between it and the roller I; and the glass $g^2$ from furnace N passes over roller H and between it and roller J forming a second layer of glass. The wire, mesh, or other form of wire or metal, passes vertically downward between the small rollers $m$ and $n$ which make good electrical contact with the wire $w$ as it is fed downwardly and the wire passes then between the two layers $g^1$ and $g^2$ between the rollers H and F. The finished product is led off to a table or platform T moving toward the left.

Current is led in by the conductor 1 to the rollers $m$ and $n$, thence through the wire $w$, then out through both layers $g^1$ and $g^2$ to the rollers H and F, which are electrically connected to each other and to the conductor 2. Here, the wire is heated electrically just as it enters the freshly made and rolled glass, which glass is retained sufficiently hot and molten to make a good welding and good contact with the wire, by the current passed therethrough.

In Fig. 5, a pour of glass $g^1$ is placed between the rollers 7 and 8 and another, $g^2$, upon the roller 9, the wire $w$ passing over roller 8 and between the two resulting layers formed between rollers 7 and 9. Here the current is led in, for example, from conductor 1 through brush $9^a$, to shaft or slip ring $9^b$, in electrical communication with the surface of the roller 9, thence through the layers $g^2$ and $g^1$ to roller 7, thence to shaft or slip ring $7^b$, brush $7^a$ to conductor 2, the current maintaining or increasing the temperature of the molten glass as may be desired.

In Fig. 6 a further roller 10 holds the wire $w$ in good electrical contact with the roller 8 as it is fed. Current passes in from source G and source $G^1$ through brush $8^a$, to the shaft or slip ring $8^b$ in electrical communication with the surface of the roller 8, thence through the wire $w$, the path for the source G being completed through the wire $w$ to the glass $g^2$, and the roller 9, $9^b$ and $9^a$; and the current of the source $G^1$ passing from the wire $w$ through the layer $g^1$ to roller 7, $7^b$, $7^a$.

In Fig. 7 a single source of current is employed and the current enters by conductor 1 having branches $1^a$ and $1^b$, current passing through layers $g^1$ and $g^2$ to the wire $w$ and thence out by roller 8 to conductor 2.

The rollers of all the arrangements hereindescribed may be of any suitable metal; or those rollers which conduct current to or from the glass in contact with the glass may have their surfaces made of carbon or graphite, by securing circular blocks of carbon or graphite upon the peripheries of the rolls. The carbon or graphite will conduct current readily, and will prevent any sticking of the glass to the rolls in case very high temperature operation is resorted to. Furthermore, the rolls and table, where a table is used, may be electrically heated by embedding just beneath their surfaces resistance materials through which electric currents may be passed in the manner well understood in the art of electric heating.

The wire $w$ employed may be the ordinary wire mesh. Or it may be mesh formed by separate strands of wire with the joints welded to each other, as by electric welding. Or the material to be embedded in the glass may be expanded metal, in which case there are no joints, but the material is one continuous electrical conductor.

The electrical conductivity of the glass may be varied by admixing with the sand or silica, or other basic material used, suitable salts, as sodium, potassium, calcium, lead, etc., which tend to reduce the electrical resistance.

What I claim is:

1. The process of embedding a conductor of electricity in glass, which consists in passing an electric current through said conductor while being introduced into glass to heat said conductor, and passing electric current through the glass to heat the same while said conductor is being embedded in said glass.

2. The process of embedding a conductor of electricity in glass, which consists in passing electric current through the contact between said conductor and the glass as said conductor is being embedded in the glass.

3. In the manufacture of wire glass, the combination with means for making layers of glass, means for introducing wire between said layers of glass, and means for passing electric current through said wire and said glass.

4. As an improvement in the process of embedding material in glass, the step which consists in passing an electric current through said material and said glass in series.

5. As an improvement in the art of making wire glass, the method which consists in mechanically embedding wire between layers of glass, and passing electric current through said wire and said layers of glass at the region of introduction of said wire between said layers.

6. As an improvement in the art of making wire glass, the method which consists in mechanically embedding wire between layers of glass, and passing electric current in series through said wire and said layers of glass.

In testimony whereof I have hereunto affixed my signature in the presence of the two subscribing witnesses.

CORNELIUS D. EHRET.

Witnesses:
ELEANOR T. McCALL,
ANNA E. STEINBOCK.